United States Patent [19]

Yoneda

[11] 4,442,342
[45] Apr. 10, 1984

[54] THERMAL PRINTER WITH PRINT DENSITY CONTROL

[75] Inventor: Shigeo Yoneda, Yamatokoriyama, Japan

[73] Assignee: Sharp Kabushiki Kaisha, Osaka, Japan

[21] Appl. No.: 373,681

[22] Filed: Apr. 30, 1982

[30] Foreign Application Priority Data

May 1, 1981 [JP] Japan .................................. 56-67140

[51] Int. Cl.³ .......................................... H05B 3/00
[52] U.S. Cl. ............................... 219/216; 346/76 PH; 400/120
[58] Field of Search ................... 346/76 PH; 400/120; 219/216 PH

[56] References Cited

U.S. PATENT DOCUMENTS

| | | | |
|---|---|---|---|
| 3,934,695 | 1/1976 | Kovalick | 219/216 PH |
| 3,975,707 | 8/1976 | Ito et al. | 219/216 PH |
| 4,113,391 | 9/1978 | Minowa | 400/120 |
| 4,168,421 | 9/1979 | Ito | 346/76 PH |

FOREIGN PATENT DOCUMENTS

| | | | |
|---|---|---|---|
| 55-87286 | 7/1980 | Japan | 400/120 |
| 55-90382 | 7/1980 | Japan | 400/120 |
| 56-40572 | 4/1981 | Japan | 400/120 |

*Primary Examiner*—B. A. Reynolds
*Assistant Examiner*—Teresa J. Walberg
*Attorney, Agent, or Firm*—Birch, Stewart, Kolasch & Birch

[57] ABSTRACT

There is disclosed a print density control for use in a thermal printer, which control is responsive to variation in a supply voltage for assuring a uniform print density. The control includes a voltage-to-frequency converter for varying the frequency of an output signal in accordance with the amplitude of the supply voltage to the print head. An enabling voltage is applied to the print head until a count characteristic of the frequency of the output signal from the voltage-to-frequency converter reaches a predetermined value. By controlling the conduction duration of the print head in response to variations in the supply voltage, the thermal energy conveyed from the print head to a heat sensitive sheet is fixed to thereby assure uniform print density. In a preferred form, there are further provided a control circuit for permitting voltage supply to the print head until the count reaches the predetermined value and for varying the current conduction duration of the print head as a function of variations in the supply voltage to the print head. Accordingly, the strength of thermal energy being supplied to the print head is kept constant regardless of variations in the supply voltage to the print head.

4 Claims, 17 Drawing Figures

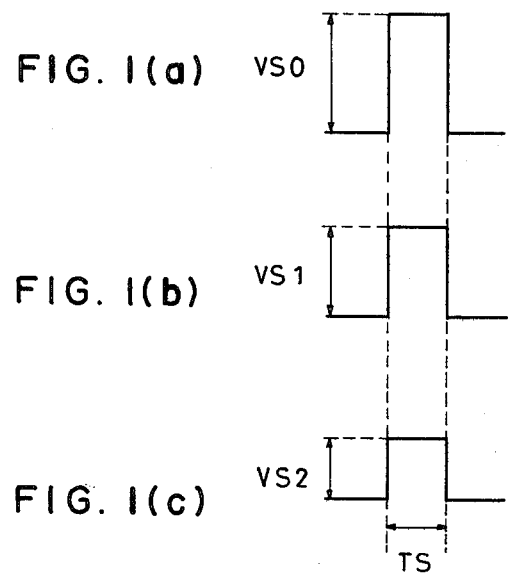
FIG. 1(a) VS0
FIG. 1(b) VS1
FIG. 1(c) VS2
TS
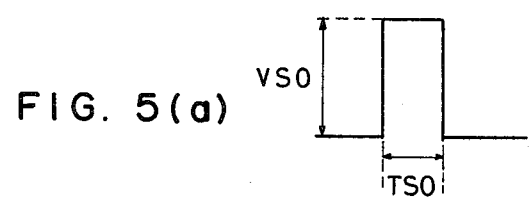
FIG. 5(a) VS0
TS0
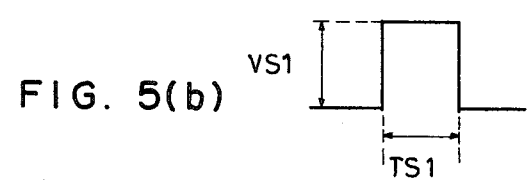
FIG. 5(b) VS1
TS1
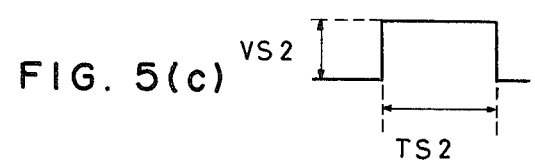
FIG. 5(c) VS2
TS2

FIG. 4(a) print start signal

FIG. 4(b) print data

FIG. 4(c) V-F converter out put

FIG. 4(d) counter out put

FIG. 4(e) flip-flop out put

FIG. 4(f) supply voltage for print head

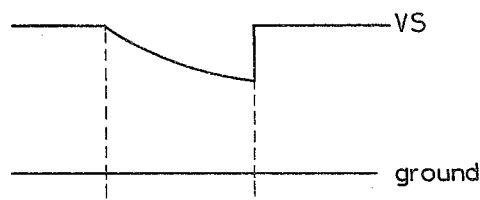
FIG. 6(a) source voltage
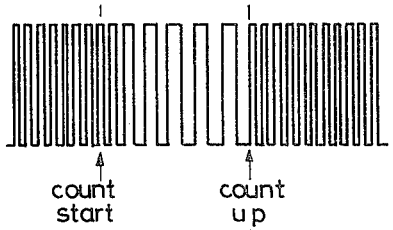
FIG. 6(b) V-F converter output
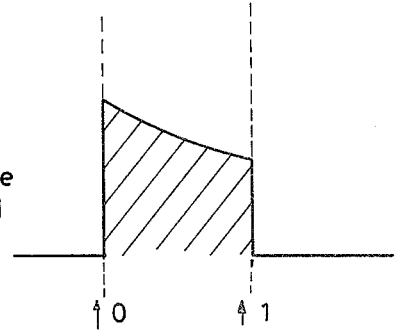
FIG. 6(c) supply voltage for print head

THERMAL PRINTER WITH PRINT DENSITY CONTROL

BACKGROUND OF THE INVENTION

This invention relates to a print density control for use in a thermal printer which effects printing by application of heat from a print head to a heat-sensitive sheet.

In a conventional thermal printer, the duration of the supply of power to the print head is kept constant regardless of the level of a supply voltage to the print head. Energy E (Joule) applied to the print head can be generally represented as follows where $V_s$ (volts) is the applied voltage to the print head, $T_s$ (seconds) is the duration of the supply of power (operation) to the print head and r (ohms) is the resistance of the print head.

$$E = (V_s^2/r) \times T_s \quad (1)$$

This inplies that the energy E applied to the print head varies as functions of the supply voltage $V_s$ to the print head and the duration $T_s$ of voltage supply (conduction) to the print head. Should the duration $T_s$ of conduction of the print head be kept constant regardless of the supply voltage $V_s$ to the print head, the energy E to the print head is constant to provide a constant print density unless the supply voltage $V_s$ varies. However, in the case where a battery having no constant voltage property, e.g. a manganese battery widely used for a variety of electric equipments, is used as a power source of the thermal printer, the supply voltage $V_s$ to the print head varies gradually as labeled $V_{s0}$, $V_{s1}$ and $V_{s2}$ ($V_{s0} > V_{s1} > V_{s2}$) in FIGS. 1(a), 1(b) and 1(c) as the residual capacity of the manganese battery declines. This results in the problem of decreasing density of printouts on the heat-sensible sheet.

OBJECT AND SUMMARY OF THE INVENTION

Accordingly, it is an object of the present invention to provide a thermal printer which avoids the above discussed problem with the conventional thermal printer.

It is another object of the present invention to provide a thermal printer in which print density is controllable in response to the level of supply voltage to the print head.

In a preferred aspect of the present invention, there is provided a print density control for a thermal printer for effecting printing by application of heat energy to a print head, which control comprises a voltage-to-frequency converter for varying the frequency of the output signal in accordance with an applied voltage to the print head. A predetermined print enabling voltage is applied to the print head until a count characteristic of the frequency of the output signal from the voltage-to-frequency converter reaches a predetermined value. By controlling the conduction duration of the print head in response to variations in the enabling voltage, the thermal energy conveyed from the print head to a heat-sensitive sheet is fixed to thereby assure uforvm print density.

BRIEF DESCRIPTION OF THE DRAWINGS

For a more complete understanding of the present invention and for further objects and advantages thereof, reference is now made to the following description taken in conjunction with the accompanying drawings, in which:

FIGS. 1(a), 1(b) and 1(c) are illustrations of variations in an applied voltage to a print head of a conventional thermal printer;

FIGS. 4(a), 4(b), 4(c), 4(d), 4(e) and 4(f) are time charts for explaining operation of the thermal printer of FIG. 2;

FIGS. 5(a), 5(b) and 5(c) are illustrations of variations in applied voltage to the print head through operation of the print density control as shown in FIG. 2; and FIGS. 6(a), 6(b) and 6(c) are time charts showing an enabling voltage, the output of the voltage-to-frequency converter and applied voltage to the print head when a manganese battery is used.

DETAILED DESCRIPTION OF THE INVENTION

Figure 2:
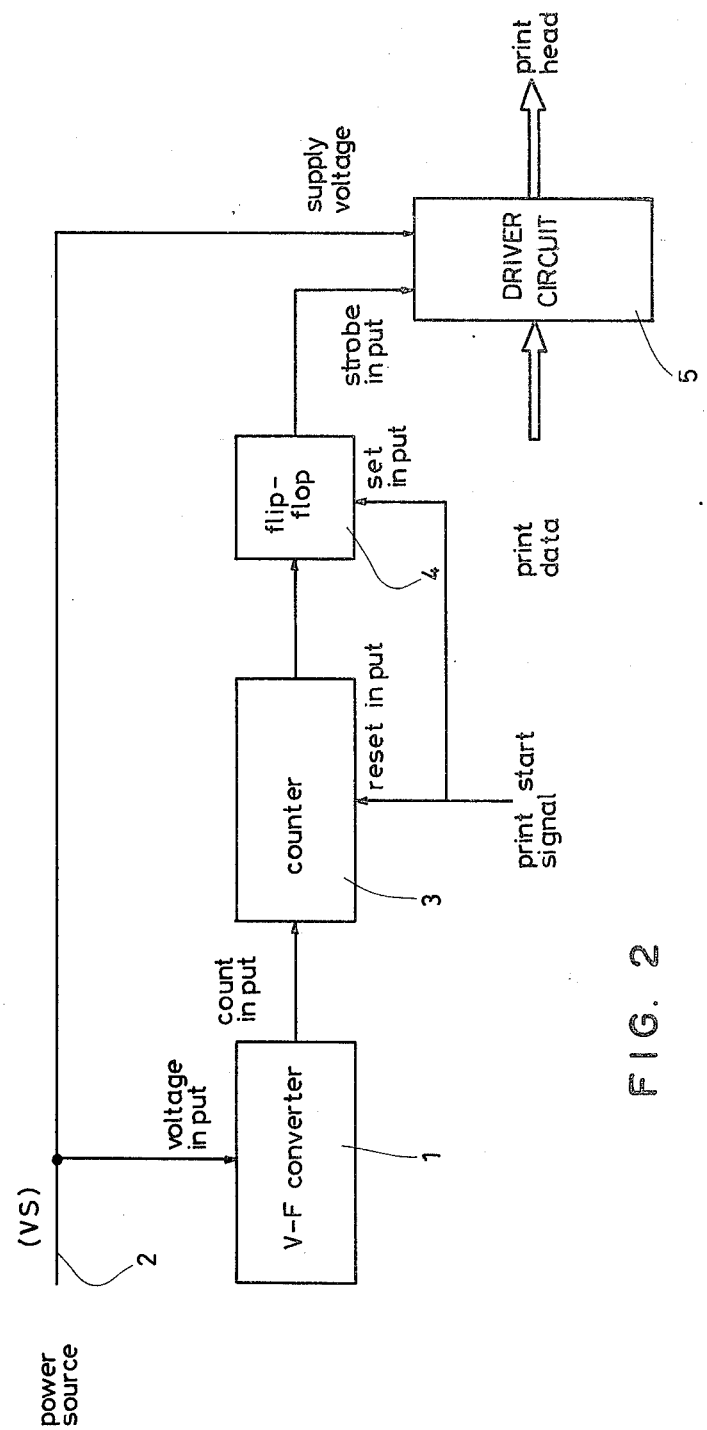
FIG. 2 is a block diagram of a print density control for a thermal printer according to the present invention.
Figure 3:
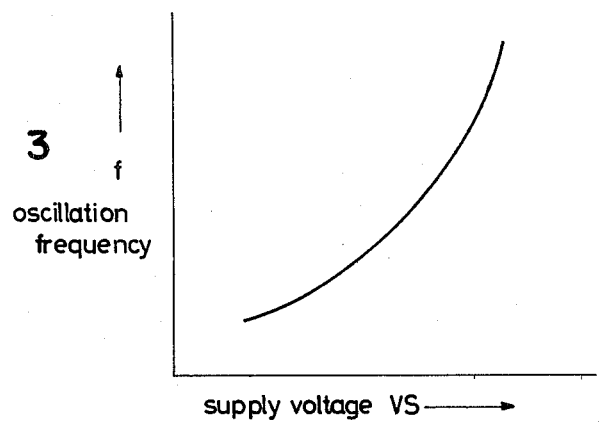
FIG. 3 is a graph of the relation between input voltage and oscillation frequency of a voltage-to-frequency converter.

Referring now to FIG. 2, there is schematically illustrated in a block diagram a print head control for use in a thermal printer, which control includes a voltage-to-frequency converter 1 (this is referred to as "V/F converter" hereinafter) which provides an output signal whose frequency varies as a function of a supply voltage $V_s$ supplied from a power line 2 to a print head of a thermal printer, a counter 3 which receives and counts the output signal of the V/F converter, a flip-flop 4 which receives as a reset input a count-up signal from the counter 3, and a drive circuit 5 which controls the duration of current conduction or operation of the print head in response to the output of the flip-flop 4 as well as driving the print head of the thermal printer in accordance with print data. Although not shown in detail, the V/F converter 1 may be designed using any wellknown circuit or circuits (e.g. a nonstable multivibrator) such that the frequency (oscillation frequency) f of the output signal thereof varies substantially in proportion to the voltage $V_s$ applied from the power line 2 to the print head as shown in FIG. 3 and especially shows a decrease and an increase in the oscillation frequency f when the supply voltage $V_s$ is low and high, respectively.

The counter 3 which counts the frequency of the output signal from the V/F converter is reset with a print start signal and provides a count-up signal as a reset input for the flip-flop 4 when the count thereof reaches a predetermined value. The flip-flop 4 also receives as a set input the print start signal and provides the set output thereof for the driver circuit 5 as a strobe input.

The driver circuit 5 includes a switching circuit which is responsive to the strobe input from the flip-flop 4 for switching on and off current conduction originating from the supply voltage $V_s$ fed from the power line 2 to the print head.

With the print density control for the thermal printer as illustrated and described above, the V/F converter 1 furnishes an oscillation output as shown in FIG. 4(a) to the counter 3, depending on the level of the supply voltage $V_s$ supplied from the power line 2 to the print head.

Assume now that the print start signal is applied to the counter 3 and the flip-flop 4 under these circumstances. The counter 3 is cleared at the trailing edge $t_0$ of the print start signal as seen in FIG. 4(e). Having being cleared, the counter 3 starts counting the oscillation output of the V/F converter 1.

On the other hand, when the flip-flop 4 is set, the driver circuit 5 renders the switching circuit therein conductive as seen in FIG. 4(f), permitting the supply voltage $V_s$ to be fed from the power line 2 to the print head. At the same time the driver circuit accepts the print data as seen in FIG. 4(b) and enables the print head to perform printing of the data.

As stated previously, the counter 3 starts counting the oscillation output of the V/F converter 1 at time $t_0$. When the predetermined count is reached as viewed from FIG. 4(d), the counter 3 resets the flip-flop 4 as in FIG. 4(e). In this case, the length of time $T_{01}=t_0-t_1$ extending from the beginning to the end of counting by the counter 3 is in reverse proportion to the oscillation frequency f of the V/F converter 1. As the supply voltage $V_s$ to the print head declines and the the oscillation frequency f of the V/F converter 1 decreases, the time $T_s$ as defined above becomes longer.

Provided that the flip-flop 4 is reset at time $t_1$, the driver circuit 5 renders the switching circuit therein non-conductive as shown in FIG. 4, discontinuing application of the supply voltage $V_s$ to the print head and disabling the print head at time $t_2$ as seen in FIG. 4(b).

It is obvious from the foregoing that the current conduction duration $T_s$ of the print head is equal to the time $T_{01}$. Even if the supply voltage $V_s$ to the print head decreases as labeled $V_{s0}$, $V_{s1}$ and $V_{s2}$ ($V_{s0}>V_{s1}>V_{s2}$) in FIGS. 5(a), 5(b) and 5(c), the current conduction duration $T_s$ becomes longer as labeled $T_{s0}$, $T_{s1}$ and $T_{s2}$ ($T_{s0}>T_{s1}>T_{s2}$). The print head is therefore supplied with energy of a fixed strength regardless of variations in the supply voltage $V_s$. This makes it possible to feed to the heat-sensitive sheet energy necessary to assure uniform print density.

Among others, in the case where a manganese battery having no stable voltage property is used as a power source of the thermal head, load for the manganese battery becomes heavier and the supply voltage $V_s$ to the print head decreases due to the internal resistance of the manganese battery as depicted in FIG. 6(a) upon applying conduction current to the print head.

Although such a decrease in the supply voltage $V_s$ is dependent on the quantity of the data desired to be printed, the oscillation output of the V/F converter 1 traces immediately such variation in the supply voltage $V_s$ so that the print head is supplied with a voltage as shown in FIG. 6(c) and hence energy of a fixed strength.

It is obvious to those skilled in the art that the invention is applicable not only to the thermal printer but also to all of the various systems using same.

As stated above, the thermal printer embodying the invention controls the current conduction duration of the print head in accordance with variations in the supply voltage in such a manner as to fix the strength of energy to be fed to the print head and thus the quantity of heat conveyed from the print head to the heat-sensitive sheet. Printing can be effected with uniform density regardless of variations in the output voltage of the power source used. Furthermore, provided that the V/F converter and the counter are used for monitoring variations in the supply voltage as in the illustrated embodiment of the present invention, there is no need for a voltage stabilizer for stabilizing the supply voltage to the print head with resulting simplicity of circuit arrangment.

While only a certain embodiment of the present invention has been described, it will be apparent to those skilled in the art that various changes and modifications may be made therein without departing from the spirit and scope of the invention as claimed.

What is claimed is:

1. A thermal printer comprising:
   a print head for effecting printing upon supply of voltage thereto;
   voltage-to-frequency converter means responsive to the voltage supplied to said print head for producing an output signal whose frequency varies as a function of the supply voltage to said print head; and
   control circuit means for permitting voltage supply to said print head for a period determined by a predetermined number of pulses of the frequency of the output signal of said voltage-to-frequency converter to thereby control the current conduction duration of said print head as a function of the variation in the supply voltage to said print head,
   whereby the strength of thermal energy supplied to said print head is kept constant regardless of variations in the supply voltage to said print head.

2. A thermal printer comprising:
   a print head for effecting printing on a heat-sensitive member upon application of heat thereto;
   means for supplying a voltage to said print head to thereby heat said head;
   voltage-to-frequency converter means responsive to the voltage supplied to said print head for producing an output signal whose frequency varies as a function of the supply voltage to said print head;
   counter means for counting each pulse in the output signal of said voltage-to-frequency converter means and for providing a count-up signal when the count thereof reaches a predetermined value;
   flip flop circuit means set with a print start signal and reset with said count-up signal and producing a pulse width variable output; and
   means responsive to said flip flop circuit means for driving said print head with the voltage only when said pulse width variable output from said flip flop is received,
   whereby the conduction duration of said print head is varied with variations in the supply voltage to said print head and the strength of thermal energy being supplied to said print head is kept constant.

3. The printer of claim 2 wherein the relationship between said voltage and the frequency of the output signal of said voltage-to-frequency converter is a non-linear function.

4. The printer of claim 3 wherein the pulse width variable output of said flip-flop circuit means responds substantially instantaneously to the frequency of the output signal of said voltage-to-frequency converter.

* * * * *